United States Patent [19]

Takahashi et al.

[11] 3,978,829

[45] Sept. 7, 1976

[54] SELF-ADJUSTABLE CAMSHAFT DRIVE MECHANISM

[75] Inventors: Koichi Takahashi, Yokohama; Nobuteru Hitomi, Yokosuka, both of Japan

[73] Assignee: Nissan Motor Co., Ltd., Yokohama, Japan

[22] Filed: June 9, 1975

[21] Appl. No.: 585,052

[30] Foreign Application Priority Data

June 10, 1974 Japan.............................. 49-64913

[52] U.S. Cl................................ 123/90.15; 64/24; 74/568 R; 123/90.17
[51] Int. Cl.² ............................................ F01L 1/34
[58] Field of Search ............. 64/24, 25; 123/90.15, 123/90.16, 90.17, 90.18, 90.11, 90.12; 74/568 R

[56] References Cited

UNITED STATES PATENTS

| | | | |
|---|---|---|---|
| 3,113,561 | 12/1963 | Heintz | 123/90.17 |
| 3,144,009 | 8/1964 | Goodfellow | 123/90.17 |
| 3,292,604 | 12/1966 | Riffe | 123/90.17 |
| 3,401,572 | 9/1968 | Bailey | 123/90.15 |
| 3,626,720 | 12/1971 | Meacham | 123/90.15 |
| 3,633,555 | 1/1972 | Raggi | 123/90.17 |
| 3,685,499 | 8/1972 | Meacham | 123/90.15 |

*Primary Examiner*—Charles J. Myhre
*Assistant Examiner*—Daniel J. O'Connor

[57] ABSTRACT

Valve opening and closing timing is varied by adjusting the relative angle of the camshaft to the driving crankshaft in dependence on engine load.

11 Claims, 8 Drawing Figures

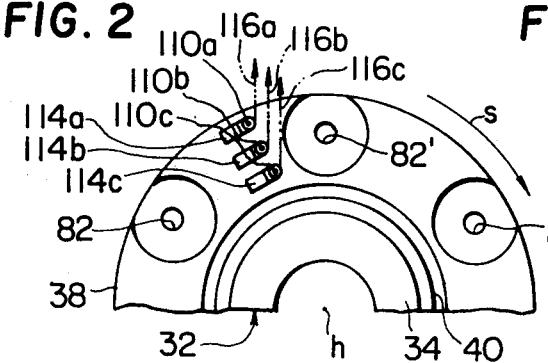
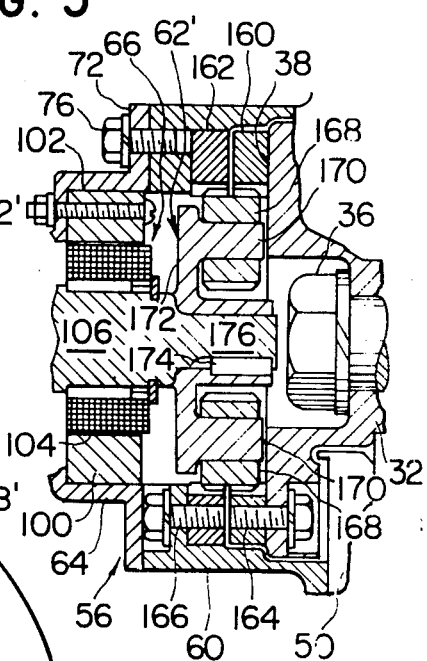
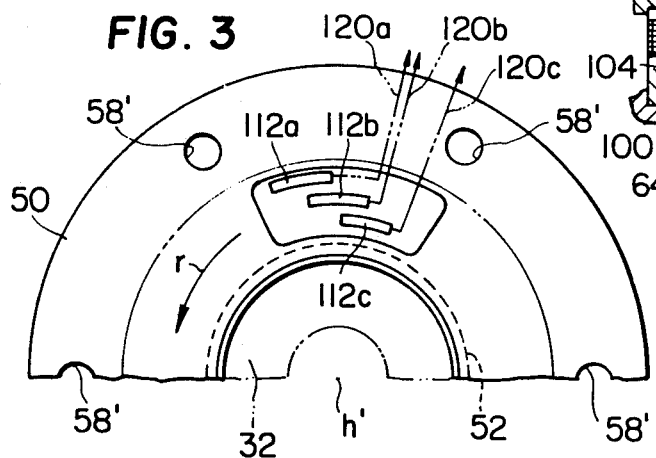
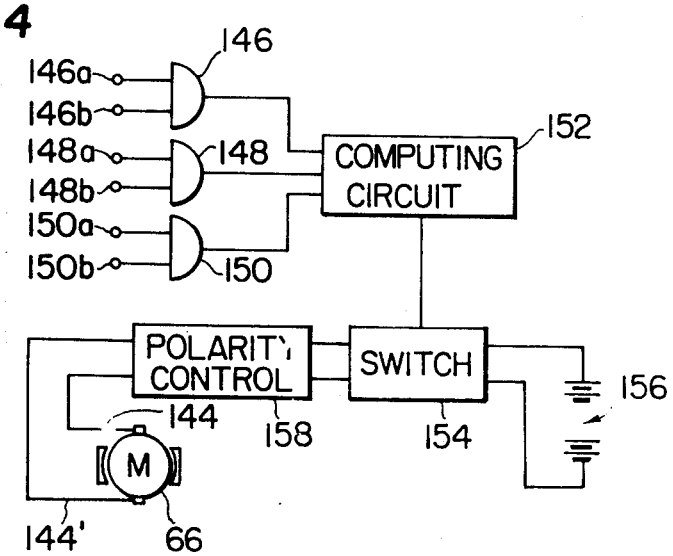

SELF-ADJUSTABLE CAMSHAFT DRIVE MECHANISM

The present invention relates in general to internal combustion engines of automotive vehicles and, more particularly, to a self-adjustable camshaft drive mechanism for an internal combustion engine having a variable valve timing camshaft.

The conventional spark-ignition internal combustion engine uses a camshaft which is arranged to open and control closing of intake and exhaust valves of the engine at timings which are fixed for the entire operating conditions of the engine. The design of profiles in the prior art camshaft therefore requires compromise of the mutually conflicting requirements of light-load and heavy-load operating conditions of the engine. Because, however, of the limitations of such a compromise, it has been inevitable that either of the requirements of the light-load or heavy-load operations of the engine is sacrificed if the other of the requirements is to be met to a satisfactory extent.

A variable valve timing camshaft has therefore been developed to provide a useful solution to this problem, using camshaft drive means to advance or retard a certain drive member (such as for example a chain used in a chain and sprocket arrangement) connected to the camshaft or permitting cam segments of the camshaft to rotate relative to the shank portion of the camshaft so that the opening and closing timings of the intake and exhaust valves of the engine are varied in relation to preselected operating conditions of the engine such as the output speed of the engine and the vacuum developed in the intake manifold of the engine. The variable valve timing camshaft of this nature has contributed to improving the performance and efficiency and fuel economy of the engine and to reducing toxic exhaust emissions from the engine but difficulties are still encountered in such a camshaft especially in controlling the valve timings strictly in accordance with the varying operating conditions of the engine and in providing a compact mechanism to vary the mode of operation of the camshaft responsive to the variation in the operating conditions of the engine. The present invention contemplates elimination of all these problems that have been inherent in the prior art variable valve timing camshafts of spark-ignition internal combustion engines of automotive vehicles.

It is, therefore, an important object of the present invention to provide a self-adjustable camshaft drive mechanism which has a simple and economical construction and which is readily controlled in strict relation to the varying operational conditions of the engine.

In accordance with the present invention, such an object will be accomplished in a self-adjustable camshaft mechanism which comprises a camshaft drive member rotatable relative to the camshaft about an axis substantially in line with the axis of rotation of the camshaft and drivable from the crankshaft of the engine, a differential reduction gear unit coaxially rotatable in its entirety with the camshaft drive member and operatively connected to the camshaft, drive means coaxially rotatable in its entirety with the camshaft drive member and the reduction gear unit and having an output shaft drivingly connected to the reduction gear unit and rotatable relative to the camshaft and the camshaft drive member about an axis in line with the axis of rotation of the camshaft, the gear unit being operative to transmit therethrough driving torque from the output shaft of the drive means to the camshaft drive member with reduction of speed of revolution at a predetermined ratio for producing relative rotation between the camshaft and the camshaft drive member by an angle and in a direction which are related to the angle and direction of rotation of the output shaft of the drive means, sensing means associated with the camshaft and the camshaft drive member for detecting an angle and direction of relative rotation between the camshaft and the camshaft drive member and producing an output signal substantially representative of the angle and direction of the detected relative rotation between the camshaft and the camshaft drive member, and control means responsive to the output signal of the sensing means and to preselected operational parameters of the engine for producing a control signal effective to actuate the drive means for causing the output shaft of the drive means to rotate a number of turns and in a direction which are dictated by the above mentioned control signal.

The differential reduction gear unit forming part of the self-adjustable camshaft drive mechanism thus constructed may consist of either a harmonic drive unit or an epicyclic gear train, both of which are, in themselves, well known in the art. The harmonic drive unit or the epicyclic gear train includes first and second internally toothed or splined members having different numbers of teeth and in mesh with a common externally toothed or splined rotary member which is driven from the above mentioned drive means so that the second toothed member turns farther than the first toothed member for producing relative rotation between the camshaft and the camshaft drive member as will be described in more detail.

The features and advantages of the self-adjustable camshaft drive mechanism according to the present invention will become more apparent from the following description taken in conjunction with the accompanying drawings in which like reference numerals designate corresponding parts and structures and in which:

FIGS. 2 and 3 are end views showing upper halves of rotatable members carrying sensing means forming part of the camshaft drive mechanism illustrated in FIG. 1;

FIG. 4 is a block diagram showing a preferred example of an electric control unit which may be incorporated into the embodiment shown in FIGS. 1 to 3;

FIG. 5 is a longitudinal section view which shows part of another preferred embodiment of the self-adjustable camshaft drive mechanism according to the present invention;

Figure 1:
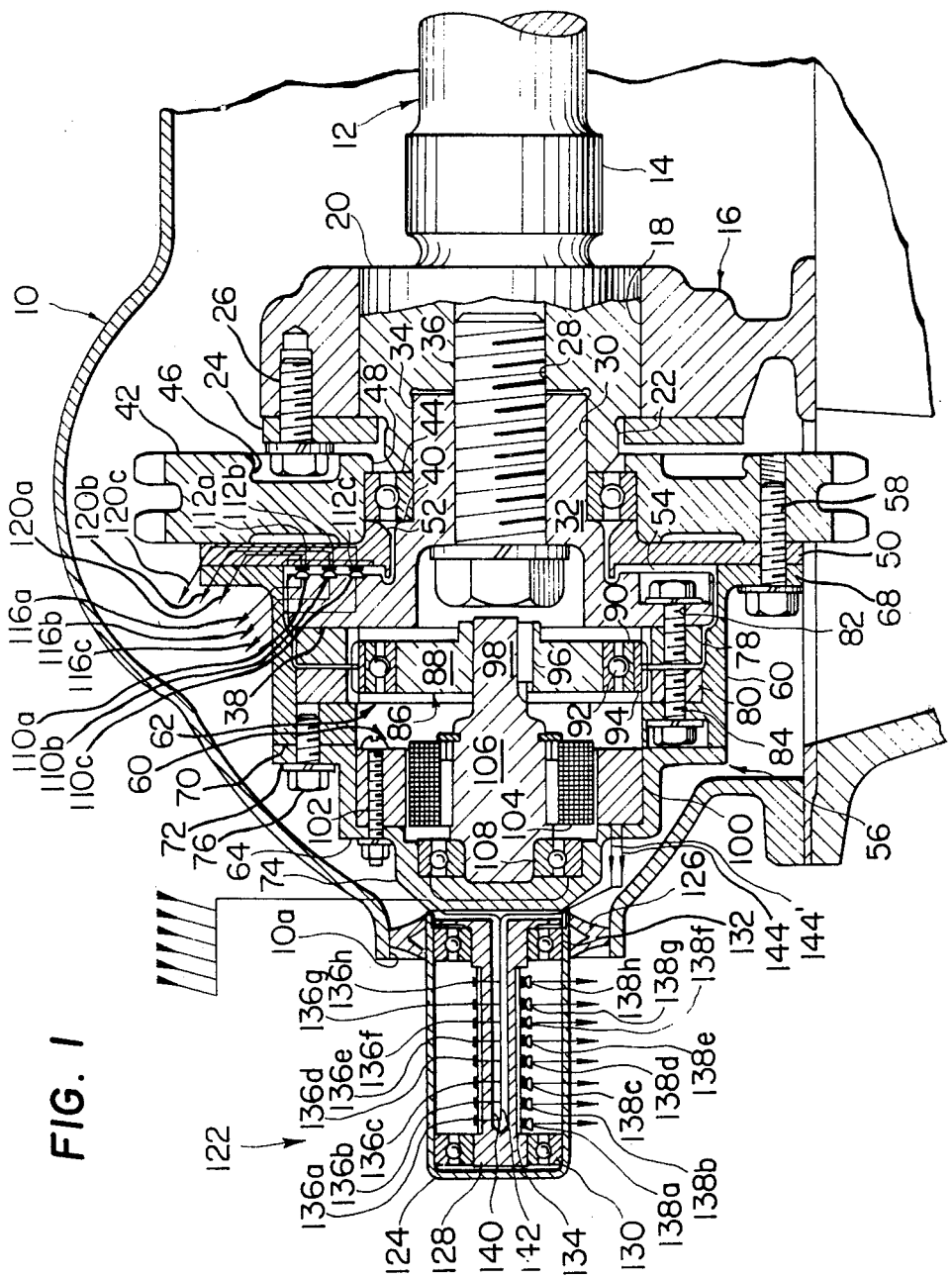
FIG. 1 is a longitudinal section view showing a preferred embodiment of the self-adjustable camshaft drive mechanism according to the present invention.

Reference will now be made to the accompanying drawings, first to FIG. 1 which shows a sketch of the overall construction of a first preferred embodiment of the self-adjustable camshaft drive mechanism according to the present invention. The camshaft drive mechanism is encased, with a few exceptions described, within a stationary outer housing structure 10 and is intended to drive a camshaft 12 to rotate about its axis for providing intake and exhaust valve timings which are variable in accordance with the various operating conditions of the engine. The internal combustion engine incorporating the camshaft drive mechanism is assumed to be of the single or double overhead-camshaft type and, as such, the stationary outer housing structure 10 is assumed to form part of the cylinder head, or the rocker cover, of the engine. The camshaft 12, only part of which is shown in FIG. 1 for the sake of simplicity of illustration, has a number of cam segments one of which is shown as at 14 and controls the opening and closing movements of the intake and exhaust valves (not shown) of the engine cylinders through the cam followers or valve lifters (not shown) respectively engaging the individual cam segments, as is well known in the art. The stationary outer housing structure 10 is formed with an opening 10a which is located substantially in alignment with the axis of rotation of the camshaft 12 for the reason explained later.

The stationary outer housing structure 10 has fixedly supported therewithin a bearing block 16 which is formed with a circular opening 18 having a central axis in line with the axis of rotation of the camshaft 12. The camshaft 12, in turn, has formed at one axial end thereof a journal segment 20 which is circumferentially slidably received in the circular opening 18 in the bearing block 16. The camshaft 12 is further formed with an axial extension 22 which projects from the end of the journal segment 20 in opposite direction to the cam segment 14 and which is smaller in diameter than the journal segment 20 which thus has an annular end face adjacent to the extension 22. An annular plate 24 is securely attached to the end face of the bearing block 16 by suitable rigid fastening means such as bolts 26 (only one of which is seen in FIG. 1) so that the journal segment 20 of the camshaft 12 has its annular end face in slidable contact with the annular plate 24. The annular plate 24 thus prevents the camshaft 12 from being axially removed relative to the bearing block 16. The journal segment 20 of the camshaft 12 has formed therein an internally threaded axial bore 28 which is open to an enlarged axial bore 30 formed partly in the journal segment 20 and partly in the axial extension 22 of the camshaft 12 as shown. The axial bores 28 and 30 thus conjoined to each other have respective axes substantially in line with the axis of rotation of the camshaft 12.

A sprocket support member 32 has a boss portion 34 partially received in the enlarged axial bore 30 in the camshaft 12. The boss portion 34 is formed with an axial bore aligned with the threaded axial bore 28 in the journal segment 20 of the camshaft 12 and is fixedly secured to the journal segment 20 by suitable rigid fastening means such as a bolt 36 which is screwed into the threaded axial bore 28 in the journal segment 20 so that the sprocket carrier 32 is rotatable with the camshaft 12. The sprocket support member 32 further has an annular flange portion 38 which is axially spaced a predetermined distance apart from the annular plate 24 on the bearing block 16 and which merges into the above mentioned boss portion 34 through a stepped cylindrical wall portion 40 having an annular end face which is axially spaced a predetermined distance from the leading end of the axial extension 22 of the camshaft 12. An annular sprocket wheel 42 is concentrically supported on the boss portion 34 of the sprocket support member 32 through a bearing 44 which has its inner race member engaged by the boss portion 34 and its outer race member engaged by the inner circumferential edge of the sprocket wheel 42. The sprocket wheel 42 is located in close proximity to the annular plate 24 on the bearing block 16 for providing compactness of the overall construction of the camshaft drive mechanism and is, for this reason, formed with an annular groove 46 into which the heads of the bolts 26 clamping the annular plate 24 to the bearing block 16 project so as not to interfere with the sprocket wheel 42 which is rotatable relative to the bearing block 16. The inner race member of the bearing 44 thus permitting the sprocket wheel 42 to rotate relative to the camshaft 12 is closely received between the leading end of the axial extension 22 of the camshaft 12 and the annular end face of the stepped cylindrical wall portion 40 of the sprocket carrier 32 so that the inner race member is prevented from being axially moved relative to the boss portion 34 of the sprocket support member 32. The sprocket wheel 42 is further formed with an inner annular flange portion 48 extending along the inner perimeter of the wheel 42 in concentrically surrounding relation to the leading end of the axial extension 22 of the camshaft 12. The inner annular flange portion 48 of the sprocket wheel 42 is in close contact with one axial end of the outer race member of the bearing 44 which is accordingly prevented from being axially moved toward the journal segment 20 of the camshaft 12. Though not shown in the drawings, the sprocket wheel 42 is operatively connected through an endless chain to a sprocket wheel which is rotatable with the crank shaft of the engine so that the sprocket wheel 42 is driven from the engine crankshaft at a speed which is one half of the speed of rotation of the sprocket wheel on the crankshaft. As an alternative to the chain drive mechanism thus arranged, either a combination of meshed gears respectively connected to the camshaft and the crankshaft or a belt and pulley arrangement using a toothed endless belt passed on toothed pulleys respectively connected to the camshaft and the crankshaft may be utilized in the camshaft drive mechanism according to the present invention, if desired.

Between the sprocket wheel 42 and the annular flange portion 38 of the sprocket carrier 32 is formed an annular space surrounding the stepped cylindrical wall portion 40 of the sprocket support member 32. An annular disc member 50 is positioned in this annular space, having an inner perimeter concentrically surrounding and appreciably spaced apart from the outer peripheral surface of the stepped cylindrical wall portion 40 of the sprocket support member 32. The annular disc member 50 is rotatable with the sprocket wheel 42 relative to the sprocket support member 32 as will be understood more clearly as the description proceeds. The annular disc member 50 has an axial projection 52 extending from the inner peripheral edge of the disc member toward the inner annular flange portion 48 of the sprocket wheel 42 so as to be in abutting engagement with the other axial end of the outer race member of the bearing 44 between the sprocket wheel 42 and the boss portion 34 of the sprocket support member 32. The bearing 44 and accordingly the sprocket wheel 42 are thus prevented from being axially moved relative to the sprocket support member 32 and accordingly to the camshaft 12 with its inner race member held in axial position between the axial extension 22 of the camshaft 12 and the annular end face of the stepped cylindrical wall portion 40 of the sprocket support member 32 and its outer race member held in axial position between the inner annular flange portion 48 of the sprocket wheel 42 and the axial projection 52 of the annular disc member 50. For the reason that will become apparent from the description to follow, it is important that the sprocket support member 32 and the annular disc member 50 be designed and positioned relative to each other in such a manner as to provide an annular space between the circular flange portion 38 of the sprocket support member 32 and the annular disc member 50 as indicated at 54 in FIG. 1.

A rotatable inner housing structure 56 is attached to the outer face of the annular disc member 50 and is fixedly secured to the disc member 50 and through the disc member 50 to the sprocket wheel 42 by means of bolts 58 only one of which is shown in FIG. 1. The inner housing structure 56 is thus rotatable with the annular disc member 50 and the sprocket wheel 42 about an axis which is substantially in line with the aligned axes of rotation of the sprocket wheel 42 and the camshaft 12. The housing structure 56 is shown to consist of a generally cylindrical gear support member 60 for supporting therewithin a differential reduction gear unit which is designated in its entirety by reference numeral 62 and a motor support member 64 for suppporting therein a gear drive motor which is generally designated by reference numeral 66. The gear support member 60 has a cylindrical wall portion having formed at one axial end thereof an outer annular flange 68 through which the gear support member 60 is fixedly secured to the annular disc member 50 and the sprocket wheel 42 by means of the previously mentioned bolts 58 and at the other axial end thereof an inner annular flange 70 which is spaced a predetermined distance from the outer end face of the flange portion 38 of the sprocket support member 32. The gear support member 60 has a portion surrounding the flange portion 38 of the sprocket support member 32, the portion having an inside diameter larger than the outside diameter of the annular flange portion 38 so that the inner peripheral surface of the gear support member 60 does not interfere with the portion 38 when the sprocket support member 32 is rotated relative to the rotatable inner housing structure 56. On the other hand, the motor support member 64 has a cylindrical wall portion having formed at one axial end thereof an annular flange 72 and a generally cup-shaped end wall portion 74 which is axially opposite to the flanged end of the cylindrical wall portion. The motor support member 64 is fixedly secured to the gear support member 60 by means of bolts 76 (only one of which is seen in FIG. 1 clamping the flange 72 of the motor support member 64 to the inner annular flange 70 of the gear support member 60. The cup-shaped end wall portion 74 of the motor support member 64 is located in the vicinity of the previously mentioned opening 10a of the stationary outer housing structure 10 as shown.

The differential reduction gear unit 62 which is positioned within the gear support member 60 of the rotatable inner housing structure 56 thus configured is assumed, in the embodiment shown in FIG. 1, to be constituted by a harmonic drive unit which per se is well known in the art. The harmonic drive unit 62 comprises first and second internally splined circular rings 78 and 80 which are coaxially juxtaposed between the outer end face of the annular flange portion 38 of the sprocket support member 32 and the inner end face of the inner annular flange 70 of the gear support member 60 and which have respective axes substantially in line with the aligned axes of rotation of the sprocket support member 32, sprocket wheel 42 and camshaft 12. The first internally splined circular ring 78 is fixedly secured to the outer end face of the annular flange portion 38 of the sprocket support member 32 by means of bolts 82 and the second internally splined circular ring 80 is fixedly secured to the inner end face of the inner annular flange 70 of the gear support member 60 by means of bolts 84. The first internally splined circular ring 78 is thus rotatable about its axis relative to the rotatable inner housing structure 56, whilst the second internally splined circular ring 80 has a fixed relative position to the housing structure 56. The first and second internally splined circular rings 78 and 80 have different numbers $N_1$ and $N_2$ of teeth respectively. It is herein assumed that the number $N_1$ of the teeth of the first internally splined ring 78 is smaller by a predetermined integer $n$ than the number $N_2$ of the teeth of the second internally splined ring 80 so that the relationship $N_2 - N_1 = n$ holds. The harmonic drive unit 62 further comprises an elliptical rotor assembly 86 which consists of an inner rotor element 88 having an elliptic outer perimeter, an outer ring 90 having elliptic inner and outer perimeters, and a number of ball bearings 92 positioned between the inner rotor element 88 and the outer ring 90. The inner rotor element 88 and the outer ring 90 have substantially fixed angular positions relative to each other despite the existence of the ball bearings 92 therebetween because the inner rotor element 88 and the outer ring 90 have elliptic outer and inner perimeters, respectively. An externally splined flexible ring 94 is closely fitted on the entire outer peripheral surface of the outer ring 90 of the rotor assembly 86 and is externally in mesh with both of the first and second internally splined circular rings 78 and 80. The number of external teeth of the flexible ring 94 is equal to the number $N_1$ of the teeth of the first internally splined circular ring 78 and is thus smaller by a prescribed integer $n$ than the number of teeth $N_2$ of the second internally splined circular ring 80 of the rotor assembly 86. Because, in this instance, the rotor assembly 86 has an elliptic outer circumference formed by the outer perimeter of the outer ring 90, the flexible ring 94 received on the rotor assembly 86 also has an elliptic configuration and is consequently in mating engagement with the internally splined circular rings 78 and 80 only at its teeth found on and in the vicinity of the major axis of the elliptical rotor assembly 86. The inner rotor element 88 of the elliptical rotor assembly 86 is connected through a key 96 to an input shaft 98 which is rotatable about an axis substantially in line with the central axis of the elliptical rotor assembly 86, the axis of rotation of the input shaft 98 being also in line with the aligned axes of the first and second internally splined circular rings 78 and 80. The input shaft 98 thus connected to the rotor assembly 86 of the harmonic drive unit 62 is drivable for rotation about its axis by means of the previously mentioned gear drive motor 66 which is mounted on the motor support member 64 of the rototable inner housing structure 56.

The gear drive motor 66 is a reversible d.c. torque motor which is comprised, mechanically, of a generally cylindrical stator 100 fixedly mounted on the motor support member 64 by means of suitable fastening means such as bolts 102 only one of which is shown in FIG. 1 and a rotor core 104 positioned inside the stator 100 and rotatable about an axis which is substantially in alignment with the axis of rotation of the input shaft 98 of the harmonic drive unit 62 and accordingly with the axis of rotation of the rotatable inner housing structure 56. The rotor core 104 includes an output shaft 106 which is connected at one axial end to the input shaft 98 of the harmonic drive unit 62 and which is received at the other axial end in a bearing 108 which is, in turn, received on the inner peripheral surface of the cup-shaped end wall portion 74 of the motor support member 64 of the housing structure 56. While the output shaft 106 of the gear drive motor 66 has been assumed to be directly coupled to the input shaft 98 of the harmonic drive unit 62, a suitable speed reduction mechanism (not shown) may be connected between the output shaft 106 of the motor 66 and the input shaft 98 of the harmonic drive unit 62, if desired.

The harmonic drive unit 62 and the gear drive motor 66 thus supported within the rotatable inner housing structure 56 are rotatable as a single unit relative to the stationary outer housing structure about an axis in line with the axis of rotation of the sprocket wheel 42 when the sprocket wheel 42 is driven from the engine crankshaft and, in turn, drives the rotatable inner housing structure 56 for rotation about its axis. If the gear drive motor 66 is kept de-energized and accordingly the harmonic drive unit 62 is kept at rest with the rotatable elements of the drive unit 62 held stationary relative to the rotatable inner housing structure 56, the driving torque imparted from the crankshaft of the engine to the sprocket wheel 42 is transmitted through the rotatable inner housing structure 56 to the second internally splined circular ring 80 which is fixedly secured to the housing structure 56. With the first and second internally splined circular rings 78 and 80 maintained stationary relative to the rotor assembly 86, the driving torque which has been transmitted to the second internally splined circular ring 80 is transmitted through the externally splined flexible ring 94 on the rotor assembly 86 to the first internally splined circular ring 78 and from the circular ring 78 to the camshaft 12 through the sprocket support member 32 to which the first internally splined circular ring 78 is fixedly secured. The sprocket wheel 42, the rotatable inner housing structure 56, the harmonic drive unit 62, the gear drive motor 66, the sprocket support member 32 and the camshaft 12 are, in this manner, rotated as a single unit about the aligned axes of rotation of the camshaft 12 and the sprocket wheel 42. Under these conditions, the angular positions of the sprocket wheel 42 and the camshaft 12 relative to each other are maintained unchanged because the rotatable inner housing structure 56 to which the sprocket wheel 42 is fixedly connected through the annular disc member 50 is held stationary relative to the sprocket support member 32 to which the camshaft 12 is fixedly connected although the rotatable inner housing structure 56 is rotating about its axis relative to the stationary outer housing structure 10.

If, on the contrary, the sprocket wheel 42 and accordingly the rotatable inner housing structure 56 are held stationary relative to the stationary outer housing structure 10 and if the gear drive motor 66 is energized, then the input shaft 98 and the rotor assembly 86 of the harmonic drive unit 62 are driven by the output shaft 106 of the gear drive motor 66 so that the externally splined flexible ring 94 on the elliptical circumference of the rotor assembly 86 rolls on the first and second internally splined circular rings 78 and 80. Under these conditions, the first internally splined circular ring 78 is maintained in situ because of the fact that the number $N_1$ of the internal teeth thereof is equal to the number of the external teeth of the flexible ring 94 as previously mentioned. Because, however, the number $N_2$ of the internal teeth of the second internally splined circular ring 80 is larger by $n$ than the number $N_1$ of the external teeth of the flexible ring 94, the second internally splined circular ring 80 is driven by the flexible ring 94 for rotation about its axis relative to the stationary outer housing structure 10 is a direction opposite to the direction of rotation of the rotor assembly 86 and at an angular speed equal to $(N_2 - N_1)N_1 = n/N_1$ of the angular speed of rotation of the rotor assembly 86, viz., the output speed of the gear drive motor 66. The driving torque thus imparted to the second internally splined circular ring 80 of the harmonic drive unit 62 is transmitted through the rotatable inner housing structure 56 to the sprocket wheel 42 with the result that the second internally splined circular ring 80, rotatable inner housing structure 56, annular disc member 50 and sprocket wheel 42 are rotated as a single unit about their aligned axes through a central angle dictated by the number of revolutions of the rotor assembly 86 of the harmonic drive unit 62 and in a direction opposite to the direction of rotation of the rotor assembly 86. Because, in this instance, the angular positions of the sprocket support member 32 and the camshaft 12 relative to the stationary housing structure 10 are unchanged with the first internally splined circular ring 78 of the harmonic drive unit 62 held in situ, the angular position of the sprocket wheel 42 relative to the camshaft 12 is changed by an angle which is proportional to the number of revolutions of the output shaft 106 of the gear drive motor 66. If the gear drive motor 66 is energized while the sprocket wheel 42 is being driven from the engine crankshaft so that the rotatable inner housing structure 56, harmonic drive unit 62, gear drive motor 66, annular disc member 50 and camshaft 12 are being bodily rotated relative to the stationary outer housing structure 10, and thus the angular position of the sprocket wheel 42 relative to the camshaft 12 can be changed so that the intake and exhaust valve timings of the internal combustion engine as provided by the camshaft 12 are advanced or retarded depending upon the speed, duration and direction of which the output shaft 106 of the gear drive motor 66 is energized. The angle and the direction with which the sprocket wheel 42 is to be rotated relative to the camshaft 12 are determined through detection of the angular position of the sprocket wheel 42 relative to the camshaft 12 and various preselected operating conditions of the engine such as for example the output speed of the engine and the vacuum which is developed in the intake manifold of the engine.

For the purpose of detecting the angular positions of the sprocket wheel 42 and the camshaft 12 relative to each other, the self-adjustable camshaft drive mechanism shown in FIG. 1 is provided with sensing means which comprise a first set of electrically conductive contact elements 110a, 110b and 110c which are mounted through suitable insulating means (not shown in FIG. 1) on the inner face of the annular flange portion 38 of the sprocket support member 32 fixedly connected to the camshaft 12 and a second set of electrically conductive contact elements 112a, 112b and 112c which are mounted through suitable insulating means (not shown in FIG. 1) on the outer face of the annular disc member 50 fixedly secured between the sprocket wheel 42 and the rotatable inner housing structure 56. The contact elements 110a, 110b and 110c on the flange portion 38 of the sprocket support member 32 are engageable with the contact elements 112a, 112b and 112c, respectively, on the annular disc member 50 when the sprocket wheel 42 and the camshaft 12 and, accordingly, the annular disc member 50 and the flange portion 38 of the sprocket support member 32 assume specific angular positions relative to each other. The arrangement of the first set of contact elements 110a, 110b and 110c and the arrangement of the second set of contact elements 112a, 112b and 112c are more clearly illustrated in FIGS. 2 and 3.

Referring to FIG. 2, the contact elements 110a, 110b and 110c are shown to be mounted on the inner face of the annular flange portion 38 of the sprocket support member 32 through respective insulating elements 114a, 114b and 114c and are arranged in a radial direction of the inner face of the flange portion 38 at predetermined distances from the axis, indicated by h, of rotation of the sprocket support member 32. The contact elements 110a, 110b and 110c are connected to lead wires 116a, 116b and 116c, respectively, as indicated by broken lines. Designated by 82' in FIG. 2 are internally threaded holes which are formed in the annular flange portion 38 of the sprocket support member 32 and through which the bolts 82 fixedly fasten the first internally splined circular ring 78 to the flange portion 38 of the sprocket support member 32 as shown in FIG. 1.

Turning to FIG. 3, the second set of contact elements 112a, 112b and 112c is shown to be mounted through an insulating plate 118 on the outer face of the annular disc member 50. Each of the contact elements 112a, 112b and 112c extends arcuately about the axis, indicated by h', of rotation of the disc member 50 and has a predetermined length of arc. The individual contact elements 112a, 112b and 112c are located at distances equal to the distances between the axis h of rotation of the sprocket support member 32 and the individual contact elements 110a, 110b and 110c, respectively, on the annular flange portion 38 of the sprocket support member 32 shown in FIG. 2. The contact elements 112a, 112b and 112c are, furthermore, angularly displaced in staggered relation from one another so that every radially adjacent two of the contact elements have portions which are subtended by a common sector. In the arrangement shown in FIG. 3, the radially outermost contact element 112a has one half of its arc length subtended by a sector which subtends one half of the arc length of the radially intermediate contact element 112b which has the other half of its arc length subtended by a sector which subtends one half of the arc length of the radially innermost contact element 112c. The contact elements 112a, 112b and 112c are connected to lead wires 120a, 120b and 120c, respectively, as indicated by broken lines in FIG. 3. Designated by 58' are internally threaded holes which are formed in the annular disc member 50 for passing therethrough the bolts 58 which clamp the disc member 50 and the gear support member 60 of the rotatable inner housing structure 56 to the sprocket wheel 42 shown in FIG. 1.

Suppose, now, the annular disc member 50 is driven by the harmonic drive unit 62 for rotation about its axis h' counterclockwise of FIG. 3 as indicated by the arrow r, the annular disc member 50 is rotated relative to the sprocket support member 32 clockwise of FIG. 2 as indicated by the arrow s while the sprocket wheel 42, annular disc member 50, rotatable inner housing structure 56, sprocket support member 32 and camshaft 12 are rotating as a single unit relative to the stationary outer housing structure 10. In this instance, there will be six different phases in the contact conditions between the first set of contact elements 110a, 110b and 110c on the sprocket support member 32 and the second set of contact elements 112a, 112b and 112c on the annular disc member 50 depending upon the relative angular positions of the sprocket support member 32 and the annular disc member 50 and accordingly the relative angular positions of the camshaft 12 and the sprocket wheel 42. In a first phase of contact condition, all of the second set of contact elements 112a, 112b and 112c on the annular disc member 50 are located ahead of the first set of contact elements 110a, 110b and 110c on the sprocket support member 32 so that no electrical connection is established between the first and second sets of contact elements. As the annular disc member 50 is further rotated counter-clockwise of FIG. 3, the radially outermost contact element 112a on the annular disc member 50 has its leading half brought into contact with the radially outermost contact element 110a on the sprocket support member 32, providing a second phase of contact condition. Electrical connection is now made between the contact elements 110a and 110b so that the lead wires 116a and 120a are electrically connected together. In the second phase of contact condition, the remaining contact elements 112b and 112c on the annular disc member 50 are still located ahead of the associated contact elements 110b and 110c on the sprocket support member 32 so that the lead wires 116b and 120b and the lead wires 116c and 120c remain disconnected from each other. As the annular disc member 50 is further rotated counterclockwise of FIG. 3, the radially intermediate contact element 112b on the annular disc member 50 has its leading half brought into contact with the associated contact element 110b on the sprocket support member 32 with the trailing half of the contact element 112b on the disc member 50 in contact with the associated contact element 110b on the sprocket support member 32, thus establishing a third phase of contact condition between the first and second sets of contact elements. In the third phase of contact condition, not only the lead wires 116a and 120a but also the lead wires 116b and 120b are electrically connected together. When the annular disc member 50 is further rotated counterclockwise of FIG. 3 so that the radially outermost contact element 112a on the annular disc member 50 is moved past the associated contact element 110a on the sprocket support member 32, the radially innermost contact element 112c on the disc member 50 has its leading half in contact with the associated contact element 110c on the sprocket support member 32 with the training half of the radially intermediate contact element 112b on the disc member 50 in contact with the associated contact element 110b on the sprocket support member 32, providing a fourth phase of contact conditions between the first and second sets of contact elements. Under the fourth contact condition, not only the lead wires 116*b* and 120*b* but also the lead wires 116*c* and 120*c* are electrically connected together with the lead wires 116*a* and 120*a* disconnected from each other. As the annular disc member 50 is still further rotated counter-clockwise of FIG. 3, the radially intermediate contact element 112*b* on the annular disc member 50 is moved past the associated contact element 110*b* on the sprocket support member 32 and the radially innermost contact element 112*c* on the disc member 50 has its trailing half in contact with the associated contact element 110*c* on the sprocket support member 32, providing a fifth phase of the contact condition between the first and second sets of contact elements. Under these conditions, only the lead wires 116*c* and 120*c* are electrically connected together. When the annular disc member 50 is further rotated and accordingly the radially innermost contact element 112*c* on the disc member 50 is moved past the associated contact element 110*c* on the sprocket support member 32 in a sixth phase of contact condition, none of the contact elements 112*a*, 112*b* and 112*c* on the annular disc member 50 is in contact with the contact elements 110*a*, 110*b* and 110*c* on the sprocket support member 32 so that the lead wires 116*a*, 116*b* and 116*c* are all disconnected from the lead wires 120*a*, 120*b* and 120*c*, respectively, as in the first phase of the contact condition between the first and second sets of contact elements. A total of five kinds of electric signals are in these manners produced as the annular disc member 50 is rotated relative to the sprocket support member 32 depending upon the relative angular positions of the two members 50 and 32 and accordingly of the sprocket wheel 42 and the camshaft 12. These signals are fed to an electric control circuit for energizing the gear drive motor 66 in accordance with predetermined schedules based on prescribed operating conditions of the engine such as for example the output speed of the engine and the vacuum developed in the intake manifold of the engine. For this purpose, the lead wires 116*a* to 116*c* and 120*a* to 120*c* are drawn out of the stationary outer housing structure 10 through a slip-ring unit which is designated in its entirety by reference numeral 122 in FIG. 1.

Turning back to FIG. 1, the slip-ring unit 122 comprises a cylindrical housing 124 which is fixedly supported by an annular support member 126 on the stationary outer housing structure 10 through the previously mentioned opening 10*a* formed in the housing structure 10 in the vicinity of the cup-shaped end wall portion 74 of the motor support member 64 of the rotatable inner housing structure 56. The cylindrical housing 124 has supported therein a rotatable shaft 128 through bearings 130 and 132. The rotatable shaft 128 is received at its opposite axial ends in the bearings 130 and 132 and has an axis of rotation substantially in line with the aligned axes of the individual rotatable members and structures of the camshaft drive mechanism accomodated within the stationary outer housing structure 10. The shaft 128 is wrapped in a cylindrical insulating sleeve 134 and has carried on the insulating sleeve 134 a plurality of electrically conductive slip rings which are herein shown as being eight in number as indicated at 136*a* to 136*h*. A plurality of brushes 138*a* to 138*h* are fixedly mounted on the cylindrical housing 124 through insulating means (not shown) and are elastically held in contact with the slip rings 136*a* to 136*h*, respectively, on the rotatable shaft 128. The brushes 138*a* to 138*h* are connected to respective lead wires (not numbered). The rotatable shaft 128 is formed with an axial bore 140 which is open at one end of the shaft 128 close to the cup-shaped end wall portion 74 of the motor support member 64 within the stationary inner housing structure 56. The individual slip rings 136*a* to 136*h* are connected to respective lead wires commonly designated by reference numeral 142 which are drawn out of the slip-ring unit 122 through the axial bore 140 thus formed in the rotatable shaft 128. The lead wires 142 which are connected to three of the slip rings 136*a* to 136*h* are connected to the lead wires 116*a*, 116*b* and 116*c* connected to the contact elements 110*a*, 110*b* and 110*c*, respectively, on the sprocket support member 32, and the lead wires 142 which are connected to the other three slip rings 136*a* to 136*h* are connected to the lead wires 120*a*, 120*b* and 120*c* connected to the contact elements 112*a*, 112*b* and 112*c*, respectively, on the annular disc member 50. The lead wires connected to the remaining two of the slip rings 136*a* to 136*h* are connected to lead wires, designated by 144 and 144', of the d.c. torque motor 66 mounted on the motor support member 64 of the rotatable inner housing structure 56. The conductors providing electrical connection between the first set of contact elements 110*a*, 110*b* and 110*c* on the sprocket support member 32 and those of the slip rings 136*a* to 136*h* which are allocated to the contact elements 110*a* to 110*c* are arranged to rotate with the sprocket support member 32 and, likewise, the conductors providing electrical connection between the second set of contact elements 112*a*, 112*b* and 112*c* on the annular disc member 50 and those of the slip rings 136*a* to 136*h* which are allocated to the contact elements 112*a* to 112*c* and between the lead wires 144 and 144' of the motor 66 and those of the slip rings 136*a* to 136*h* allocated to the lead wires 144 and 144' are arranged to be rotatable with the rotatable inner housing structure 56. When the rotatable members and structures positioned within the stationary outer housing structure 10 are rotated relative to the stationary outer housing structure 10, then the conductors connecting the first and second sets of contact elements are revolved with the rotary members and structures about an axis in line with the aligned axes of rotation of the rotary members and structures so that the rotatable shaft 128 of the slip-ring unit 122 is also rotated about its axis. Electrical connection is established between each of the lead wires 116*a* to 116*c* and 120*a* to 120*c* and the lead wires 144 and 144' and between each of the lead wires leading from the brushes 138*a* to 138*h* which are elastically pressed against the respective slip rings 136*a* to 136*h* even when the rotary members and structures accomodated within the stationary outer housing structure 10 are rotated relative to the housing structure 10. The conductors connected to the first and second sets of contact elements 110*a* to 110*c* and 112*a* to 112*c* should further be arranged in such a manner as to be amenable to change into the relative angular positions of the sprocket support member 32 and the annular disc member 50.

Though not shown in the drawings, the lead wires leading from those two of the brushes 138*a* to 138*h* which are connected to the lead wires 144 and 144' of the gear drive motor 66 through the associated two of the slip rings 136*a* to 136*h* are connected to a d.c. power source across an electric control unit which controls the motor as will be described later. The lead wires leading from those three of the brushes 138a to 138h which are connected to the lead wires 116a, 116b and 116c leading from the first set of contact elements 110a, 110b and 110c, respectively, on the sprocket support member 32 or the lead wires 120a, 120b and 120c leading from the second set of contact elements 112a, 112b and 112c, respectively, on the annular disc member 50 through the associated three of the slip rings 136a to 136h are grounded and, furthermore, the lead wires leading from the remaining three of the brushes 138a to 138h are connected to input terminals of the control unit for the gear drive motor 66. For simplicity of description, it is herein assumed that the lead wires 116a, 116b and 116c leading from the first set of contact elements 110a, 110b and 110c on the sprocket support member 32 are connected to the input terminals of the control unit through the slip rings 136a 136b and 136c and the slip ring unit 122 and the lead wires 120a, 120b and 120c leading from the second set of contact elements 112a, 112b and 112c on the annular disc member 50 are grounded through the slip rings 136d, 136e and 136f and the brushes 138a, 138b and 138c, respectively, of the slip ring unit 122. The lead wires 144 and 144' of the gear drive motor 66 are thus assumed to be connected across the d.c. power source and the control unit for the motor 66 through the slip rings 136g and 136h and the brushes 138g and 138h, respectively, of the slip-ring unit 122. The control for the gear drive motor 66 produces an output signal for controlling the motor 66 in accordance with predetermined schedules on the basis of the previously mentioned five kinds of signals which are produced in the lead wires 116a to 116c connected to the first set of contact elements 110a to 110c on the sprocket support member 32 as the sprocket wheel 42 changes its relative angular position to the camshaft 12 and on the basis of various prescribed parameters indicative of preselecteed operating conditions of the engine which has its intake and exhaust valves actuated by the camshaft 12. A preferred example of the circuit arrangement of the control unit to achieve this purpose is diagrammatically illustrated in FIG. 4.

Referring to FIG. 4 as well as FIGS. 1 to 3, such a control unit is shown to comprise a logic circuit which consists of first, second and third logic "AND " gate circuits 146, 148 and 150 each having first and second input terminals which are indicated by subscripts a and b added to the reference numeral of the "AND" gate circuit. The respective first input terminals 146a, 148a and 150a are connected to the lead wires leading from the above mention brushes 138a, 138b and 138c, respectively, of the slip-ring unit 122 and through the associated slip rings 136a, 136b and 136c of the slip-ring unit 122 to the lead wires 116a, 116b and 116c leading from the first set of contact elements 110a, 110b and 110c, respectively, mounted on the sprocket support member 32. During the previously mentioned first phase of contact condition between the first and second sets of contact elements on the sprocket support member 32 and the annular disc member 50, all of the first set of contact elements 110a to 110c on the sprocket support member 32 are out of contact with the second set of contact elements 112a to 112c and, accordingly, all of the lead wires 116a to 116c leading from the first set of contact elements 110a to 110c are disconnected from the lead wires 120a to 120c leading from the second set of contact elements 112a to 112c, respectively, with the result that a logic 0 signal appears at each of the first input terminals 146a to 150a of the "AND" gate circuits 146 to 150. During the second phase of contact condition between the first and second sets of contact elements 110a to 110c and 112a to 112c, the radially outermost contact element 110a on the sprocket support member 32 is in contact with the associated contact element 112a on the annular disc member 50 with the other contact elements 110b and 110c on the sprocket support member 32 maintained out of contact with the respectively associated contact elements 112b and 112c on the disc member 50 so that electrical connection is established between the lead wires 116a and 120a leading from the contact elements 110a and 112a, respectively. A logic 1 signal is therefore fed to the first input terminal 146a of the first "AND" gate circuit 146 while each of the first input terminals 148a and 150a of the second and third "AND" gate circuits 148 and 150 is kept supplied with the logic 0 signal at its first input terminal. Under the third phase of contact condition between the first and second contact elements 110a to 110c and 112a to 112c, both of the contact elements 110a and 110b on the sprocket support member 32 are in contact with the associated contact elements 112a and 112b, respectively, on the annular disc member 50 with the remaining contact element 110c on the sprocket support member 32 kept isolated from the associated contact element 112c on the disc member 50 and, as a consequence, electrical connection is established not only between the lead wires 116a and 120a leading from the contact elements 110a and 112a but also between the lead wires 116b and 120b leading from the contact elements 110b and 112b. Under these conditions, a logic 0 signal appears at each of the first input terminals 146a and 148a of the first and second "AND" gate circuits 146 and 148 with the first input terminal 150a of the third "AND" gate circuit 150 kept supplied with the logic 0 input signal. Under the fourth phase of the contact condition in which the radially outermost contact element 110a on the sprocket support member 32 is disengaged from the associated contact element 112a on the annular disc member 50 and the remaining two contact elements 110b and 110c on the sprocket support member 32 are in contact with the associated contact elements 112b and 112c, respectively, on the annular disc member 50 so that the electrical connection between the lead wires 116a and 120a is interrupted and electrical connections are established between the lead wires 116b and 120b leading from the contact elements 110b and 112b and between the lead wires 116c and 120c leading from the contact elements 110c and 112c. A logic 0 signal thus appears at the first input terminal 146a of the first "AND" gate circuit 146 and, at the same time, a logic 1 signal appears at each of the first input terminals 148a and 150a of the second and third "AND" gate circuits 148 and 150, respectively. Under the fifth phase of contact conditions between the first and second sets of contact elements 110a to 110c and 112a to 112c, only the radially innermost contact element 110c on the sprocket support member 32 is in contact with the associated contact element 112c on the annular disc member 50 and accordingly electric connection is established only between the lead wires 116c and 120c leading from the contact elements 110c and 112c. A logic 0 signal therefore appears at each of the first input terminals 146a and 148a of the first and second "AND" gate circuits 146 and 148, respectively, and a logic 1 signal appears at the first input terminal 150a of the third "AND" gate circuit 150. During the sixth phase of contact condition between the first and second sets of contact elements 110a to 110c and 112a to 112c, none of the first set of contact elements 110a to 110c on the sprocket support member 32 is in contact with the associated ones of the second set of contact elements 112a to 112c on the annular disc member 50 as in the case of the first phase of contact condition so that a logic 0 signal appears at each of the first input terminals 146a, 148a and 150a of the first, second and third "AND" gate circuits 146, 148 and 150. If desired, the radially outermost contact elements 112a and 112c on the annular disc member 50 shown in FIG. 3 may be arranged to have end portions which are coextensive with each other about the axis h' of the disc member 50 so that an additional phase is provided in which all of the first sets of contact elements 110a, 110b and 110c on the sprocket support member 32 are in contact with the associated ones of the second set of contact elements 112a, 112b and 112c, respectively, on the annular disc member 50. Such an additional phase will occur between the previously mentioned third and fourth phases of contact between the first and second sets of contact elements 110a to 110c 112a to 112c. Under this additional phase of the contact condition between the first and second contact elements 110a to 110c and 112a to 112c all of the lead wires 116a too 116c leading from the first set of contact elements 110a to 110c are electrically connected to their respectively associated lead wires 120a to 120c leading from the second set of contact elements 112a to 112c and, as a consequence, a logic 1 signal appears at each of the first input terminals 146a, 148a and 150a of the first, second and third "AND" gate circuits 146, 148 and 150, respectively. As an alternative to the above described arrangement, the radially outermost and innermost contact elements 112a and 112c on the annular disc member 50 may be arranged in such a manner that they have end portions which are coextensive with only the opposite end portions of the radially intermediate contact element 112b on the disc member 50. An additional phase of contact condition between the first and second sets of contact elements 110a to 110c and 112a to 112c will then be provided in which only the radially intermediate contact element 110b on the sprocket support member 32 is in contact with the associated contact element 112b on the annular disc member. Such an additional phase of contact condition also occurs between the previously mentioned third and fourth phases of the contact condition and, under the particular additional phase, a logic 1 signal will appear only at the first input terminal 146a of the second logic "AND" gate circuit 148 with logic 0 signals impressed on both of the first input terminals 146a and 150a of the first and third logic "AND" gate circuits 146 and 150.

The respective second input terminals 146b, 148b and 150b of the "AND" gate circuit 146, 148 and 150 are connected to signal generating circuits (not shown) which are responsive to pre-selected operating conditions, such as for example the output speed of the engine, the vacuum developed in the engine intake manifold, the temperature of the engine, and/or other parameters that will affect the performance characteristics of the engine and which are operative to deliver logic 0 and/or 1 output signals to the respective second input terminals 146b, 148b and 150b of the first, second and third logic "AND" gate circuits 146, 148 and 150.

Each of the first, second and third logic "AND" gate circuits 146, 148 and 150 has an output terminal through which is delivered a logic 1 or 0 signal depending on whether both input terminals receive the same signal or not, respectively. The respective output terminals of the first, second and third logical "AND" gate circuits 146, 148 and 150 are connected to a computing circuit 152 and arranged in such a manner as to produce a reference signal representative of optimum relative angular positions of the camshaft 12 and the camshaft drive sprocket wheel 42 in terms of the various parameters detected and to compare with the thus produced reference signal a signal which is indicative of the actual relative angular positions of the two members as detected by the first and second contact elements 110a to 110c and 112a to 112c and fed to the first input terminals 146a to 150a of the above mentioned logic "AND" gate circuits 146 to 150. The computing circuit 152 thus delivers an output signal if the detected relative angular positions of the camshaft 12 and the camshaft drive sprocket wheel 42 (or, actually, of the sprocket support member 32 and the annular disc member 50) differ from the optimum one which are represented by the above mentioned reference signal. The output signal is fed to a trigger terminal of a switching circuit 154 which is connected between a d.c. power source 156 and the previously mentioned lead wires 144 and 144' of the reversible d.c. torque motor 66 (FIG. 1) across a polarity control circuit 158. The switching circuit 154 is kept closed in the absence of the output signal from the computing circuit 152 and opens responsive to the output signal from the computing circuit 152, providing connections between the d.c. power source 156 and the motor 66 across the polarity control circuit 158 when the relative angular positions of the camshaft 12 and the camshaft drive sprocket wheel 42 should be corrected. The polarity control circuit 158 determines the polarity of current to be fed to the lead wires 144 and 144' of the motor 66 form the d.c. power source 156 and, accordingly, the direction in which the rotor core 104 of the motor 66 should be rotated. When the motor 66 is thus energized so that the relative angular positions of the camshaft 12 and the camshaft drive sprocket wheel 42 which is driven from the motor 66 through the previously described harmonic drive unit 62 are corrected to properly match the detected operating conditions of the engine, the computing circuit 152 ceases to supply the output signal to the switching circuit 154, which is therefore caused to open. Though not shown in the drawings, the computing circuit 152 has incorporated therein a delay circuit and a power-operated relay which are operative to enable the switching circuit 154 to remain closed for a predetermined period of time after the application of the output signal from thee computing circuit 152 to the switching circuit 154 has been interrupted. This is required to prevent the motor 66 from being brought to a stop when the computing circuit 152 delivers a new output signal shortly after it has ceased to supply an output signal as will be experienced when the relative angular positions of the first and second contact elements on the sprocket support member 32 and the annular disc member 50 are changed from one of the phases of the contact condition to another at a relatively short interval. While the computing circuit 152, the switching circuit 154 and the polarity control circuit 158 having the general functions above described are simply diagrammatically shown in FIG. 4, these circuits and the signal generating means connected to the second input terminals of the logic "AND" gate circuits 146 and 150 may be readily designed by those skilled in the art provided the parameters on the basis of which the valve timings of the engine should be controlled are specified. For this reason and because of the fact that the present invention consists of a camshaft drive mechanism which is characterized by the provision of means to detect the relative angular positions of the camshaft and the camshaft drive member such as the sprocket wheel 42 and to positively vary the relative angular positions of the two rotational members in response to a control signal which is produced externally of the camshaft drive mechanism, no practical examples of the constructions and arrangements of the circuits 152, 154, 156 and 158 nor the signal generating means connected to the second inpuut terminals of the logic control circuits 146 to 150 will be herein described and shown.

While the differential reduction gear unit incorporated into the embodiment shown in FIG. 1 has been assumed to be comprised of a harmonic drive unit, an epicyclic gear train which in itself is also well known in the art may be utilized in lieu of the harmonic drive unit the epicyclic gear train being designated in its entirety by 62' in FIG. 5.

As illustrated in FIG. 5, the epicyclic gear train 62' serving as the differential reduction gear unit in the camshaft drive mechanism embodying the present invention comprises first and second internally toothed ring gears 160 and 162 which are arranged essentially similarly to the first and second internally splined circular rings 78 and 80 of the harmonic drive unit incorporated into the embodiment shown in FIG. 1. The first and second internally toothed ring gears 160 and 162 are coaxially juxtaposed between the outer face of the annular flange portion 38 of the sprocket support member 32 and the inner end face of the inner annular flange 70 of the gear support member 60 and have respective axes substantially in line with the aligned axes of rotation of the sprocket support member 32, sprocket wheel 42 and camshaft 12. The first internally toothed ring gear 160 is fixedly secured to the outer end face of the annular flange portion 38 of the sprocket support member 32 by suitable fastening means such as bolts 164 and likewise the second internally toothed ring gear 162 is fixedly secured to the inner end face of the inner flange 70 of the gear support member 60 by suitable fastening means such as bolts 166, only one of each of the bolts 164 and 166 being illustrated in FIG. 5. The first internally toothed ring gear 160 is thus rotatable about its axis relative to the rotatable inner housing structure 56, whilst the second internally toothed ring gear 162 has a fixed position relative to the rotatable inner housing structure 56. The first and second internally toothed ring gears 160 and 162 have different numbers $M_1$ and $M_2$ of teeth, respectively. As in a case of the internally splined circular rings forming part of the previously described harmonic drive unit, the number $M_1$ of the teeth of the first internally toothed ring gear 160 is smaller by a predetermined integer $m$ than the number $M_2$ of the teeth of the second internally toothed ring gear 162 so that the relationship $M_2 - M_1 = m$ holds. The epicyclic gear train 62' further comprises a suitable number of pinion gears which are herein assumed as being two in number as indicated by reference numerals 168 and 168' and which are in mesh with both of the first and second internally toothed ring gears 160 and 162. The pin gears 168 and 168' are rotatable on respective shafts 170 and 170' having respective axes parallel with the aligned axes of rotation of the ring gears 160 and 162 and integrally connected to a common carrier 172 which is rotatable about an axis which is in line with the aligned axes of the ring gears 160 and 162. The carrier 172 is keyed as at 174 to an input shaft 176 which is integrally connected to the output shaft 106 of the gear drive motor 66. The pinion gears 168 and 168' in mesh with the first and second internally toothed ring gears 160 and 162 are not rotatable about the axes of the shafts 170 and 170' on which the gears 168 and 168' are rotatably mounted but revolvable with the carrier 170 about an axis of rotation of the input shaft 176. The epicyclic gear train 62' thus constructed is essentially a planetary gear train which is void of a sun gear and which has planetary pinions which correspond to the above mentioned pinion gears 168 and 168'. As is the case with the embodiment illustrated in FIG. 1, a suitable speed reduction gear (not shown) may be connected between the output shaft 106 of the gear drive motor 66 and the input shaft 176 of the epicyclic gear train 62' so that the driving torque from the output shaft 106 of the motor 66 is transferred with a reduction of speed at a predetermined ratio to the input shaft 176 of the epicyclic gear train 62', if desired.

The epicyclic gear train 62' and the gear drive motor 66 thus supported within the rotatable inner housing structure 56 are rotatable as a single unit relative to the stationary outer housing structure 10 (FIG. 1) about an axis which is in line with the axis of rotation of the sprocket wheel 42 when the sprocket wheel 42 is driven from the engine crankshaft (not shown). If the gear drive motor 66 is kept de-energized and accordingly the epicyclic gear train 62' is maintained at rest with all the rotary members of the gear train 62' held stationary relative to the rotatable inner housing structure 56, the driving torque imparted from the crankshaft of the engine to the sprocket wheel 42 is transmitted through the rotatable inner housing structure 56 to the second internally toothed ring gear 162 of the epicyclic gear train 62'. With the first and second internally toothed pinion gears 160 and 162 of the epicylic gear train 62' maintained stationary relative to the rotatable inner housing structure 56 as above mentioned, the driving torque which has been transmitted to the second internally toothed ring gear 162 is transmitted therefrom to the first internally toothed ring gear 160 through the pinion gears 168 and 168' on the carrier 172 of the gear train 62' and from the first internally toothed ring gear 162 to the camshaft 12 through the sprocket support member 32 to which the first internally toothed ring gear 160 is fixedly attached. The sprocket wheel 42, the rotatable inner housing structure 56, the epicyclic gear train 62', the gear drive motor 66, the sprocket support member 32 and the camshaft 12 are, in this manner, rotated as a single unit about the aligned axes of rotation of the camshaft 12 and the sprocket wheel 42. Under these conditions, the relative angular positions of the camshaft 12 and the sprocket wheel 42 and, accordingly, the relative angular positions of the sprocket support member 32 connected to the camshaft 12 and the annular disc member 50 connected to the sprocket wheel 42 are maintained unchanged although the rotatable inner housing structure 56 is rotating about its axis relative to the stationary outer housing structure 10 (FIG. 1).

If, however, the gear drive motor 66 is energized responsive to a control signal delivered from the control unit shown in FIG. 4, then the input shaft 176 of the epicyclic gear train 62' rotating about its axis together with the rotatable inner housing structure 56 is driven by the output shaft 106 of the gear drive motor 66 so that the carrier 172 is rotated about the axis of the input shaft 176. The pinion gears 168 and 168' are consequently caused to revolve about the axis of the input shaft 174 and accordingly roll on the first and second internally toothed ring gears 160 and 162 about the axes of the shafts 170 and 170', respectively. Since, in this instance, the number $M_2$ of the teeth of the second internally toothed ring gear 162 is smaller by a value $m$ than the number $M_1$ of the teeth of the first internally toothed ring gear 160, the second internally toothed ring gear 162 is outsped by an angular speed corresponding to the value $m$ by the first internally toothed ring gear 160 as the carrier 172 supporting the pinion gears 168 and 168' is rotated about the axis of the input shaft 176 of the gear train 62'. The relative angular positions of the camshaft 12 and the camshaft drive sprocket wheel 42 are consequently changed through an angle corresponding to the angular displacement between the first and second internally toothed ring gears 160 and 162 and in a direction dictated by the direction of rotation of the output shaft 106 of the gear drive motor 66, as is the case with the embodiment shown in FIG. 1.

Figure 6:
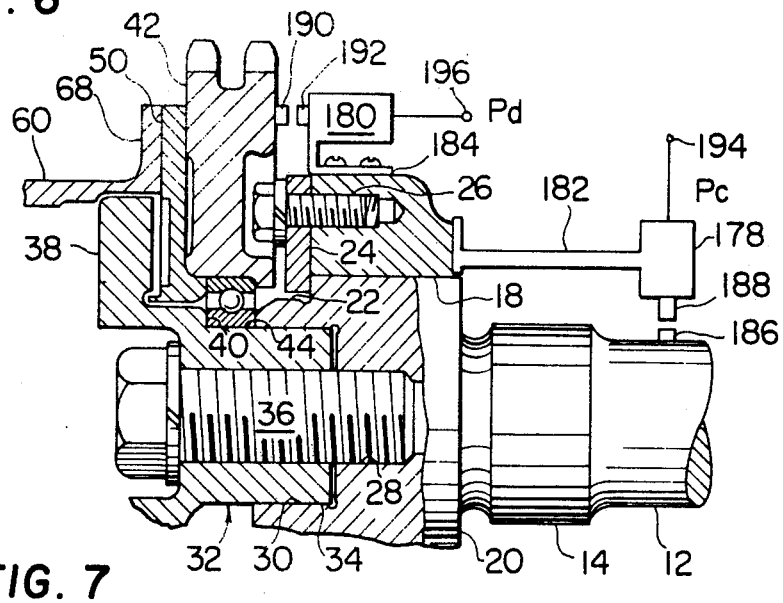
FIG. 6 is also a longitudinal section view showing part of still another preferred embodiment of the self-adjustable camshaft drive mechanism according to the present invention.

FIG. 6 illustrates another preferred example of the sensing means to detect the relative angular positions of the camshaft 12 and the camshaft drive sprocket wheel 42. While the sensing means in the embodiment shown in FIGS. 1 to 3 is arranged to indirectly detect the relative angular positions of the camshaft 12 and the sprocket wheel 42 from the relative angular positions of the sprocket support member 32 secured to the camshaft 12 and the annular disc member 50 secured to the sprocket wheel 42, the sensing means shown in FIG. 6 directly detects the relative angular positions of the camshaft 12 and the sprocket wheel 42. As illustrated in FIG. 6, the sensing means comprises first and second electro-magnetic pick-up devices 178 and 180 which are associated with the camshaft 12 and the sprocket wheel 42, respectively, and which have casings fixedly mounted through brackets 182 and 184, respectively, on the bearing block 16 which is fast on the stationary outer housing structure 10 (FIG. 1). The first electro-magnetic pick-up device 178 comprises a permanent magnet 186 which is securely mounted on a suitable portion between two adjacent cam segments 14 of the camshaft 12. The permanent magnet 186 is thus rotatable with the camshaft 12 about the axis of rotation of the camshaft 12. The first electromagnetic pick-up means 178 further comprises a magnetically inductive element 188 which is stationarily located in the vicinity of the path of rotation of the permanent magnet 186 so that an electromotive force is produced in the inductive element 188 by interaction between the inductive element 188 and the permanent magnet 186 on the camshaft 12 each time the camshaft 12 makes a single rotation about is axis, viz., in each of the cycles in which the permanent magnet 186 on the camshaft 12 is moved toward and thereafter away from the stationary inductive element 188. The first electromagnetic pick-up device 178 is thus operative to produce a train of impulses P$c$ at intervals which correspond to the full revolutions of the camshaft 12 about its axis.

Figure 7:
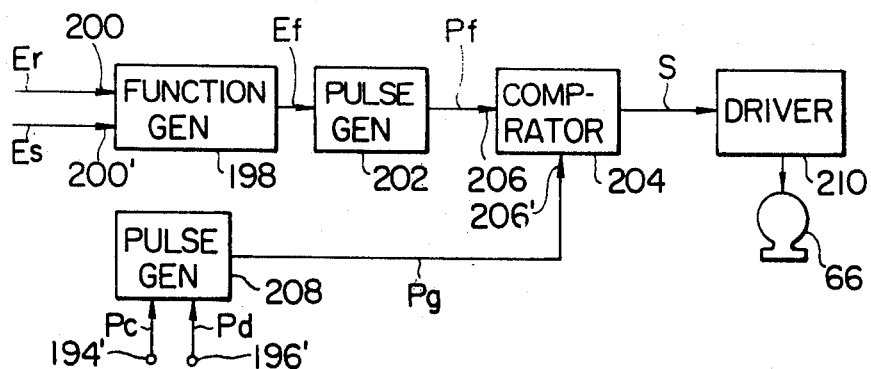
FIG. 7 is a block diagram showing a preferred example of an electric control unit which may be incorporated into the embodiment shown in FIG. 6.

The second electro-magnetic pick-up device 180 is constructed essentially similarly to the first electromagnetic pick-up device 178 and, thus, comprises a permanent magnet 190 securely attached to one end face of the sprocket wheel 42 and a magnetically inductive element 192 which is stationarily held in position in the vicinity of the path of rotation of the permanent magnet 190 on the sprocket wheel 42. An electromotive force is produced in the permanent magnet 190 each time the sprocket wheel 42 makes a single turn about its axis and accordingly the permanent magnet 190 is moved toward and away from the stationary inductive element 192. The second electromagnetic pick-up device 180 thus produces a train of impluses P$d$ at intervals which correspond to the full revolutions of the sprocket wheel 42 about its axis. The first and second electro-magnetic pick-up device 178 and 180 have respective output terminals 194 and 196 so that the impulses P$c$ and P$d$ produced therefrom are delivered to a suitable control means responsive to such signals for controlling the gear device motor 66 (FIG. 1) in accordance with predetermined schedules as previously described. FIG. 7 illustrates an example of such a control means.

Referring to FIG. 7, the control means comprises a function generator 198 having first and second input terminals 200 and 200' which are respectively connected to engine speed and intake-manifold vacuum sensors (not shown). The engine speed sensor is operative to detect the revolution speed of the engine crankshaft (not shown) and produce an analog signal E$r$ representative of the detected crankshaft revolution speed, whereas the intake-manifold vacuum sensor is operative to detect the vacuum developed in the intake-manifold (not shown) of the engine and produce an analog signal E$s$ representative of the detected intake-manifold vacuum, viz., the load exerted on the engine. The function generator 198 produces an analog output signal E$f$ indicative of an optimum angular position of the sprocket wheel 42 relative to the camshaft 12 for providing optimum intake and exhaust timings for the detected operating conditions of the engine. The signal P$f$ is thus indicative of a desired amount of deviation between the relative angular positions of the camshaft 12 and the camshaft driving sprocket wheel 42. The output signal E$f$ thus produced by the function generator 198 is fed to a first pulse generator 202 which is so arranged as to produce a train of pulses P$f$ which is related to the analog signal E$f$ impressed on the pulse generator 202 from the function generator 198. The control means shown in FIG. 7 further comprises a comparator 204 which has a first input terminal 206 connected to the output terminal of the above mentioned pulse generator 202 and a second input terminal 206' connected to the output terminal of pulse generator 208. The second pulse generator 208 has first and second input terminals 194' and 196' connected to the previously mentioned output terminals 194 and 196 of the first and second electromagnetic pick-up devices 178 and 180 respectively, shown in FIG. 6. The second pulse generator 208 is thus supplied with the impulses P$c$ and P$d$ from the first and second electromagnetic pick-up devices 178 and 180 and produces a train of pulses P$g$ indicative of the amount of deviation between the detected relative angular positions of the camshaft 12 and the camshaft drive sprocket wheel 42 from a predetermined criterion (which may be determined from the relative angular positions of the permanent magnets 186 and 190 mounted on the camshaft 12 and the sprocket wheel 42, respectively, shown in FIG. 6). The pulses Pf indicative of a desired amount of deviation between the relative angular positions of the camshaft 12 and the sprocket wheel 42 and the pulses Pg indicative of the detected amount of deviation between the relative positions of the two members are fed to the comparator 204, which is operative to compare the two kinds of digital signals Pf with each other and produce an output signal S representative of an amount of difference of the detected amount of deviation between the relative angular positions of the camshaft 12 and the sprocket wheel 42 from the desired amount of deviation therebetween. The signal S thus delivered from the comparator circuit 204 is applied to a driver circuit 210 which energizes the previously mentioned gear drive motor 66 (see FIG. 1) with a polarity and for a time interval which are dictated by the input signal S.

Figure 8:
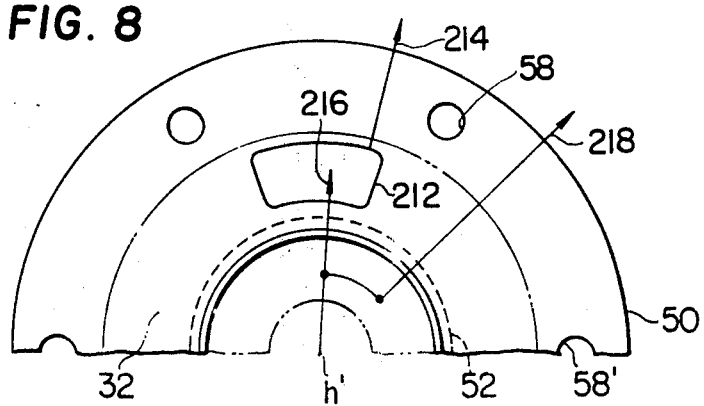
FIG. 8 is an end view which shows an upper half of a rotatable member carrying sensing means forming part of a modification of the embodiment shown in FIGS. 1 to 3.

While the sensing means incorporated into the embodimentw thus far described produce digital signals representative of the relative angular positions of the camshaft 12 and the camshaft drive member such as the sprocket wheel 42, a sensing means may be provided which produces an analog signal proportional to or otherwise related to the amount of deviation between the relative angular positions of the camshaft and the camshaft drive member, a preferred example of such a sensing means being illustrated in FIG. 8.

Referring to FIG. 8, the sensing means is provided in association with the sprocket support member 32 secured to the camshaft 12 and the annular disc member 50 secured to the sprocket wheel 42 and consists of a rheostat which comprises a continuous length of resistive conductor 212 fixedly mounted on the outer end face of the annular disc member 50 through an insulating member (not shown). The resistive conductor 212 is arranged in its entirety in a truncated sector form arcing about the axis $h'$ of the disc member 50 and has a multiplicity of alternately turned or helically coiled longitudinal sections which extend in radial directions of the end face of the annular disc member 50. The resistive conductor 212 is connected at one end to a lead wire 214 and is grounded at the other end through the disc member 50 and other metal members which are connected to the disc member 50. The rheostat further comprises a sliding contactor 216 which is fixedly mounted on the inner end face of the annular flange portion 38 (FIG. 1) of the sprocket support member 32 and which extends in a radial direction of the annular flange portion 38 of the sprocket support member 32. The sliding contactor 216 is thus rotatable with the sprocket support member 32 about the axis of the member 32 relative to the annular disc member 50 and has a leading end in slidable engagement with the alternately turned or helically coiled longitudinal sections of the resistive contactor 212 on the annular disc member 50. The sliding contactor 216 is connected to a lead wire 218. The lead wires 214 and 218 thus leading from the resistive conductor 212 and the sliding contactor 216, respectively are connected to a suitable control circuit (not shown) for the gear drive motor 66 (FIG. 1) through a slip-ring unit (not shown) which may be constructed and arranged essentially similarly to the slip-ring unit 122 shown in FIG. 1. When the sprocket support member 32 and the annular disc membr 50 with the sensing means thus arranged are rotated relative to each other about their aligned axes the sliding contactor 216 on the annular flange portion of the sprocket support member 32 slides on the turned or coiled sections of the resistive conductor 212 on the annular disc member 50 with the result that the resistance and accordingly the voltage between the ends of the conductor 212 which are connected to the lead wire 214 and the sliding contactor 216 change. The change between the relative angular positions of the sprocket support member 32 and the annular disc member 50, viz., the relative angular positions of the comshaft 12 and the camshaft drive sprocket wheel 42 is, thus, detected as a change in the electrical resistance and accordingly the voltage across the resistive conductor 212. While the sensing means incorporated into the embodiment shown in FIGS. 1 to 3 and the sensing means shown in FIG. 6 stepwise detect a change between the relative angular positions of the camshaft 12 and the camshaft drive sprocket wheel 42, the sensing means shown in FIG. 8 continuously detects such a change. The resistive conductor 212 and the sliding contactor 216 have been described and shown as being mounted on the annular disc member 50 and the sprocket support member 32, respectively, in the arrangement shown in FIG. 8, but the same may be mounted conversely on the annular flange portion 38 (FIIG. 1) of the sprocket support member 32 and the annular disc member 50, respectively, if desired.

While the drive means to transmit the driving torque from the engine crankshaft to the camshaft has been assumed to comprise a chain drive arrangement including the sprocket wheel 42, it is apparent that such a drive means may be replaced with a combination of meshed gears respectively associated with the camshaft and the engine crankshaft or a belt and pulley arrangement using a toothed endless belt passed between toothed pulleys respectively associated with the camshaft and the engine crankshaft.

What is claimed is:

1. A self-adjustable camshaft drive mechanism of an internal combustion engine having a camshaft rotatable about an axis for driving intake and exhaust valves of the engine, comprising a camshaft drive means rotatable relative to the camshaft about an axis substantially in line with the axis of rotation of the camshaft and adapted to be driven from the crankshaft of the engine, a differential reduction gear unit means coaxially rotatable in its entirety with said camshaft drive means and operatively connected to the camshaft, drive means coaxially rotatable in its entirety with said camshaft drive means and said reduction gear unit means and having an output shaft drivingly connected to said reduction gear unit and rotatable relative to the camshaft and the camshaft drive means about an axis in line with the axis of rotation of the camshaft, said gear unit means being operative to transmit therethrough driving torque from said output shaft of the drive means to said camshaft drive means with reduction of speed of revolution at a predetermined ratio for producing relative rotation between the camshaft and the camshaft drive means by an angle and in a direction which are related to the angle and direction of rotation of the output shaft of the drive means, sensing means associated with the camshaft and the camshaft drive means for detecting an angle and direction of relative rotation between the camshaft and the camshaft drive means and producing an output signal substantially representative of the angle and direction of the detected relative rotation between the camshaft and the camshaft drive means, and control means responsive to said output signal of the sensing means and to preselected operational parameters of the engine for producing a control signal effective to actuate said drive means for causing the output shaft of the drive means to rotate a number of turns and in a direction which are dictated by said control signal.

2. A self-adjustable camshaft drive mechanism as claimed in claim 1, in which said differential reduction gear unit means comprises a first internally splined circular ring coaxially rotatable with the camshaft, a second internally splined circular ring juxtaposed with said first internally splined circular ring and coaxially rotatable with said camshaft drive member, and an externally splined elliptical rotor assembly in mesh with both of said first and second internally splined circular rings and coaxially rotatable with said output shaft of said drive means, the elliptical rotor assembly having a generally elliptic outer perimeter and formed with external splines which are equal in number to the internal splines of the first internally splined circular ring and smaller in number than the internal splines of the second internally splined circular ring.

3. A self-adjustable camshaft drive mechanism as claimed in claim 2, in which said elliptical rotor assembly comprises an inner rotor element having an elliptic inner perimeter and coaxially rotatable with said output shaft of said drive means, an outer ring having elliptic inner and outer perimeters essentially similar to the elliptic outer perimeter of the inner rotor element, a number of bearings between the inner rotor element and the outer ring, and an externally splined flexible ring fitting on the outer peripheral surface of the outer ring and in mesh with said first and second internally splined circular rings.

4. A self-adjustable camshaft drive mechanism as claimed in claim 1, in which said differential reduction gear unit means comprises a first internally toothed ring gear coaxially rotatable with the camshaft, a second internally toothed ring gear juxtaposed with said first internally toothed ring gear and coaxially rotatable with said camshaft drive member, said first internally toothed ring gear having internal teeth smaller in number than the internal teeth of the second internally toothed ring gear, at least one pinion gear in mesh with both of the first and second internally toothed ring gears and rotatable about an axis parallel to the aligned axes of rotation of the ring gears, and a carrier having at least one shaft on which said pinion gear is rotatable about its axis, said carrier being coaxially rotatable with said output shaft of said drive means.

5. A self-adjustable camshaft drive mechanism as claimed in claim 1, further comprising a support member coaxially rotatable with said camshaft and supporting thereon said camshaft drive means through bearing means and a disc member coaxially rotatable with said camshaft drive member and positioned in the vicinity of said support member, said support member and said disc member having respective annular end faces which are spaced apart from each other in axial directions of the support member and the disc member.

6. A self-adjustable camshaft drive mechanism as claimed in claim 5, in which said sensing means comprises a first set of electrically conductive contact elements fixedly mounted on one of said annular end faces of said support member and said disc member, a second set of electrically conductive contact elements fixedly mounted on the other one of said annular end faces of said support member and said disc member and respectively engageable with said first set of contact elements, and wiring means connected to said first and second sets of contact elements for providing electrical connection between said contact elements and said control means, each of said first set of contact elements being in contact with the associated one of the second set of contact elements when the support member and the disc member assume relative angular positions of a specific angular range so that electrical connection is established between the associated ones of the first and second contact elements depending upon relative angular positions of the support member and the disc member.

7. A self-adjustable camshaft drive mechanism as claimed in claim 6, in which said first set of contact elements is arranged in a radial direction of said one of the end faces of the support member and the disc member and radially spaced apart at predetermined distances from the axis of said one of the end faces and said second set of contact elements extends arcuately about the axis of said other one of said end faces of the support member and the disc member and located at distances substantially equal to said distances of said first contact elements from the axis of said one of the end faces, said second set of contact elements being angularly displaced in staggered relationship from each other so that every radially adjacent two of the second set of contact elements have respective end portions which are subtended by a common sector.

8. A self-adjustable camshaft drive mechanism as claimed in claim 5, in which said sensing means comprises a continuous length of resistive condudtor fixedly mounted on one of said annular end faces of said support member and said disc member and having a multiplicity of sections extending in radial directions of said one of the end faces, a sliding contactor fixedly mounted on the other one of said annular end faces of said support member and said disc member and in slidable engagement with said sections of said resistive conductor so that the electrical resistance between one end of said conductor and the section of the conductor contacted by said contactor varies depending upon the relative angular positions of said support member and said disc member, and wiring means connected to said one end of said conductor and to said sliding contactor for providing electrical connection between said contactor and said control means through said conductor.

9. A self-adjustable camshaft drive mechanism as claimed in claim 1, in which said sensing means comprises first and second electromagnetic pick-up means respectively associated with said camshaft and said camshaft drive means for producing a first train of impulses responsive to individual revolutions of the camshaft and a second set of impulses responsive to individual revolutions of the camshaft drive means, and wiring means for connecting said first and second electromagnetic pick-up means to said control means.

10. A self-adjustable camshaft drive mechanism as claimed in claim 9, in which said first electromagnetic pick-up means comprises a permanent magnet rotatable with said camshaft and a magnetically inductive element stationarily positioned in the vicinity of the path of revolution of the permanent magnet responsive to the rotation of the camshaft rotated about its axis for producing an impulse each time the camshaft makes a single full rotation and said second electromagnetic pick-up means comprises a permanent magnet rotatable with said camshaft drive means and a magnetically inductive element stationarily positioned in the vicinity of the path of revolution of the permanent magnet responsive to the rotation the camshaft drive means about its axis for producing an impulse each time the camshaft drive means makes a single full rotation.

11. A self-adjustable camshaft drive mechanism as claimed in claim 1, in which said drive means comprises an electric motor which is coaxially rotatable in its entirety with said camshaft drive means and the differential reduction gear unit and which has a rotor core connected to said output shaft of the drive means.

* * * * *